Oct. 22, 1957　　　　C. R. FOSTER　　　　2,810,899
SIGNAL SYSTEM FOR VEHICLES
Filed Oct. 20, 1954
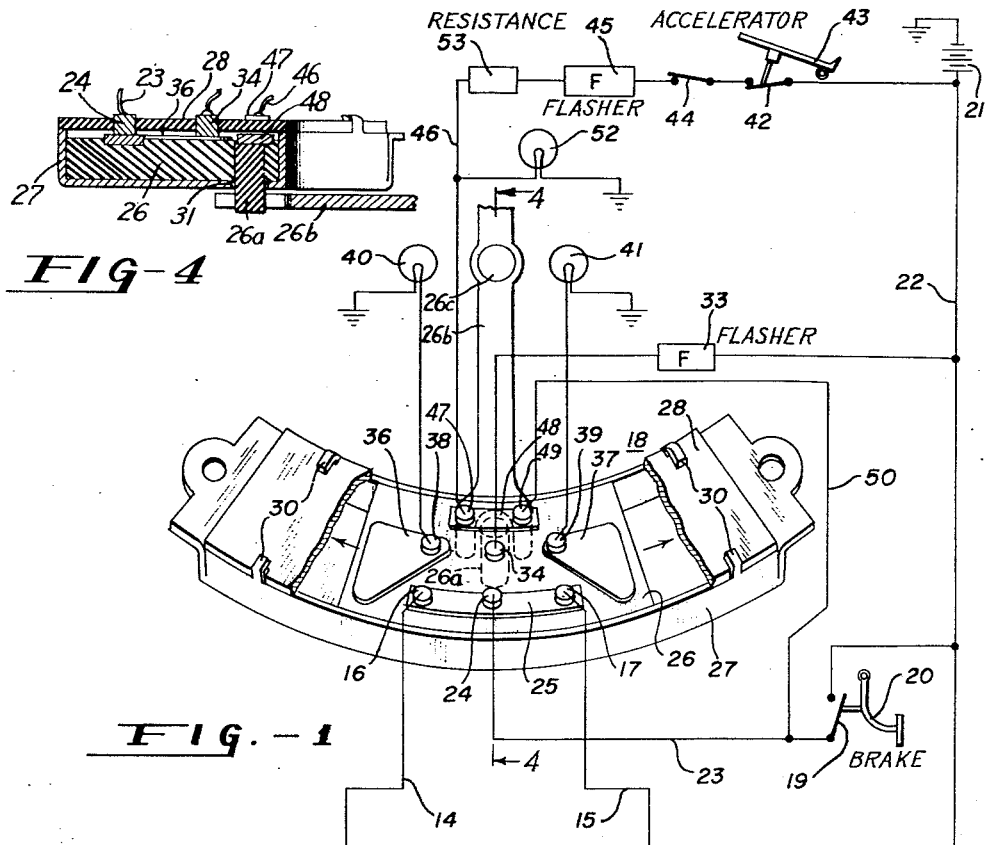
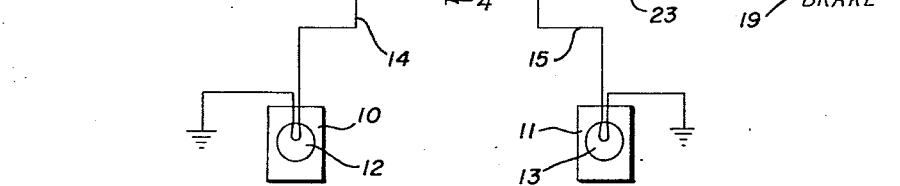
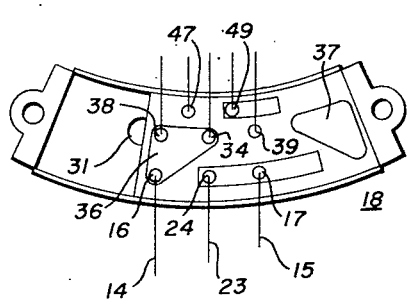
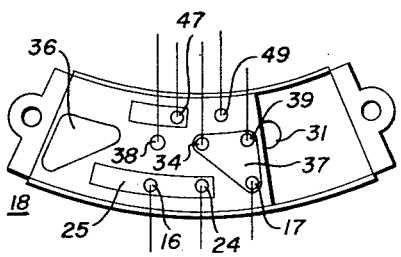
INVENTOR.
Claude R. Foster
BY
McGrew & Edwards
ATTORNEYS

United States Patent Office 2,810,899
Patented Oct. 22, 1957

2,810,899

SIGNAL SYSTEM FOR VEHICLES

Claude R. Foster, Denver, Colo.

Application October 20, 1954, Serial No. 463,569

2 Claims. (Cl. 340—72)

This invention relates to warning signal systems for motor vehicles and particularly to such systems of the type which are effective to indicate to a following vehicle the release of the throttle control of the vehicle engine.

It has been the common practice for a great many years to provide signals at the rear of motor vehicles to indicate that the vehicle is being slowed by application of the brakes. Devices have also been provided for indicating that the operator has released the throttle control and that the vehicle may therefore be slowing down. Signals are also provided to indicate that a turn is about to be made; these latter signals in present use being flashing lights at the rear of the vehicle on the side in the direction of the turn. It is desirable that signals be easily interpreted and that they be operated easily and with minimum likelihood of confusion to the operator of a following vehicle when two or more of the signal actuating operations occur simultaneously. Accordingly, it is an object of this invention to provide a warning signal system for motor vehicles for signaling following vehicles and including an improved system for signaling slow-down due to the release of the throttle control.

It is another object of this invention to provide an improved warning signal system for motor vehicles to indicate slow-down due to release of the throttle control and which shall operate with minimum likelihood of confusion or interference with other warning controls on the vehicle.

Further objects and advantages of this invention will become apparent as the following description proceeds and the features of novelty which characterize the invention will be pointed out with particularity in the claims annexed to and forming a part of this specification.

Briefly, in carrying out the objects of this invention in one embodiment a vehicle warning signal system is provided which includes stop lights arranged at the rear of the vehicle on either side thereof and a circuit for energizing the lights whenever the brake pedal is depressed. In addition to the usual stop light circuit, there is provided a turn indicator circuit which when energized produces a flashing signal on the side of the vehicle toward which the turn is being made, this signal being accomplished by flashing or intermittent energization of the corresponding one of the stop lights. A switch control for the turn indicator is provided which disconnects the normal stop light control actuated by the brake on the side toward which the turn is being made so that when the turn is to be made, if the brake is applied, the flashing signal will occur on the side toward which the turn is made while the other side will have a steady signal. In addition to the brake and turn signals, there is provided a normally closed circuit which is opened whenever the accelerator pedal is pressed and which when closed connects both stop lights to a flashing control so that a flashing indication is given whenever the accelerator pedal is released. This circuit is arranged in parallel with the stop light circuit actuated by the brakes so that whenever the brake circuit is closed, the flashing signal stops and the lights are energized steadily. The three circuits are coordinated through the turn indicator control, contacts being provided in a normally closed accelerator actuated control so that when the turn indicator is actuated, the accelerator control circuit is opened and ineffective to produce a signal upon release of the accelerator.

For a better understanding of the invention reference may be had to the accompanying drawing in which:

Fig. 1 is a diagrammatic view of the switch actuating mechanism and circuits embodying the invention;

Fig. 2 is a diagrammatic view of the switch mechanism in position to indicate a right-hand turn;

Fig. 3 is a diagrammatic view of the switch mechanism in position for indicating a left-hand turn; and Fig. 4 is an enlarged sectional view along the line 4—4 of Fig. 1.

Referring now to the drawing, the electrical circuits shown in Fig. 1 are arranged to control the operation of two stop lights 10 and 11 arranged on either side at the rear of the vehicle in accordance with the general present-day practice. The stop lights 10 and 11 include light bulbs 12 and 13 respectively, one side of each of which is connected to ground and the other side to leads 14 and 15 respectively. The leads 14 and 15 are connected to stationary terminals 16 and 17 of a switch assembly 18 through which connections are made to the several parts of the control circuits. The normal operation of the stop lights to indicate that the operator has depressed a pedal 20 and applied the brakes is effected by closing of a switch 19 to complete a circuit from a storage battery 21 through a supply line 22 and a lead 23 to a stationary contact 24 which is intermediate the contacts 16 and 17 on the assembly 18; the contacts 16, 17 and 24 are normally connected by a conducting member or bar 25 which is carried by a movable block 26 of insulating material. It is thus apparent that on closing of the switch 19 the lights 12 and 13 are energized to provide the normal stop light signal.

The switch assembly 18 as shown in Figs. 1 and 4 comprises a metal casing 27 within which the block 26 is movably mounted, both members being of arcuate form so that they may easily be operated by a radius finger or arm such as that normally provided on the steering post of automobiles for actuation of the turn signals. The stationary contacts 16, 17 and 24 are mounted in an insulating cover plate 28 rigidly secured to the case 27 by bent lugs 30, the central portion being broken away but leaving the fixed contacts in place to show their positions with respect to the movable contacts on the block 26. In the drawing, the actuating member for moving the block 26 has been illustrated in dotted lines and comprises a cylindrical post 26a of insulating material attached to the block 26 and extending downwardly through an arcuate slot 31 in the casing 27, the ends of the slot being indicated in Figs. 2 and 3. The block 26 may be slid to either side of its position as shown in Fig. 1 to positions as shown in Figs. 2 and 3. A radius arm 26b pivoted at 26c is provided to shift the block and has a forked end engaging the post 26a for this purpose.

In order to provide a flashing turn indicator on the side of the vehicle toward which the turn is to be made, an intermittent contact or flash unit 33 is connected between the line 22 and a stationary contact 34 in the plate 28 of the switch assembly 18. When the block 26 is moved to either side to indicate that a turn is about to be made, one of the two triangular-shaped conducting elements or bridge members 36 and 37 mounted on the block is moved into engagement with the contact 34 so that it connects the contact 34 and one of the contacts 16 and 17 respectively, depending upon the direction in which the block 26 has been moved. Movement of the block 26 moves the bridging members 36 and 37 and the bar 25 simultaneously to one side and when the block as shown in Fig. 1 is moved to the left to the position shown in Fig. 2, the bridging connection between the stationary contacts 17 and 24 is broken and the bridging elements 37 connects the contacts 17 and 34 so that the light bulb 13 is connected to the flashing unit 33 and is energized intermittently to provide a flashing signal indicating that a right-hand turn is to be made. When the block 26 is moved to the right, the contacts and bridging members assume the position shown in Fig. 3 so that the flashing signal 33 is connected to the bulb 12 through the contacts 16 and 34 and the bridging member 36, the connection between the contact 16 and the contact 24 being broken by the movement of the bar 25 to the right. This position of the block causes intermittent energization of the bulb 12 indicating that a left turn of the vehicle is about to be made. An additional pair of stationary contacts 38 and 39 are provided on the insulating cover 28 on either side of the contact 34 and in the path of movement of the bridging members 36 and 37. The contacts 38 and 39 are connected to signal lights 40 and 41 respectively at the front end of the vehicle, and because of the triangular shape of the members 36 and 37, the bulbs 40 and 41 are energized in parallel with the corresponding bulbs 12 and 13 when the flashing unit 33 is connected to those bulbs. This construction provides the usual indicators on either side at the front of the vehicle to provide turn signals for oncoming vehicles. It will be noted that because of the movement of the bar 25 to open the connection between the stop light and the brake actuated circuit when a turn is being indicated that should the brake pedal be depressed at the same time it will result in continuous energization only of the light 10 or 11 on the side opposite the side to which the turn is to be made.

This general arrangement of the signal system to provide co-ordinated indication of the stop light signal and the turn signals will be recognized as one arrangement in use at the present time. In addition to the braking and turn signals there is provided a third signal circuit which includes a normally closed switch 42 arranged to be opened upon actuation of the throttle of the vehicle and, as indicated in the drawing, is operated by movement of the accelerator pedal 43. The switch 42 is connected in a circuit including a lead 22a extending from the line 22 through the switch 42 and then through a manual switch 44 which may be actuated by operation of the vehicle lock, a flashing or intermittent unit 45, and a lead 46 connected to a fixed terminal 47 on the insulating cover plate 28. In the central position of the switch assembly 18 as shown in Fig. 1, the contact 47 is connected by a movable bar 48 on the block 26 to a stationary contact 49 on the same path of movement of the block as the contact 47. The stationary contact 49 is connected by a lead 50 and the lead 23 to the stationary contact 24. Thus, the normally closed circuit including the flasher 45 is normally connected to the stop lights 12 and 13 through the contact 24, the bar 25, and the contacts 16 and 17. This circuit will be open whenever the accelerator pedal is depressed but as soon as the operator moves his foot from the pedal the switch 42 will return to its normally closed position thereby energizing the circuit and energizing the lights 12 and 13 at an intermittent rate determined by operation of the flashing unit 45 and will thus give a flashing signal indicating the likelihood of slowing down of the vehicle due to the release of the throttle control. Whenever a signal for a turn is to be indicated and the block 26 is moved to one side or the other as shown in Figs. 2 and 3, the conductor bar 48 is moved out of engagement with one of the contacts 47 and 49 thereby breaking the engagement between these two contacts and interrupting the circuit of the flashing unit 45. This arrangement prevents actuation of the flashing circuit upon release of the throttle control during the period when a turn is being indicated. In this manner a simple and effective arrangement has been provided for preventing confusion of the operator of a following vehicle due to a multiplicity of flashing signals. Whenever the circuit of the flashing unit 45 is closed, a pilot light 52 mounted on the panel or dashboard of the vehicle is connected in parallel with the stop lights 12 and 13 and is operated intermittently at the flashing rate to indicate that the flashing signal is being given. The manual switch 44 is provided so that the flashing signal circuit operated by the accelerator may be interrupted whenever desired. It will be apparent however that this switch may be closed when the car is stationary and the flashing signal employed as a warning signal when the car is stopped at the side of the road for repairs or other emergencies.

The simplified system described above makes it possible to co-ordinate the three separate signal indicating mechanisms and to minimize confusion to the operator of a following vehicle in the event two or more of the signal indicating means are actuated at the same time. The system and mechanism are simple and effective in operation and require no additional signal lights at the rear of the vehicle in order to provide the throttle release signal. In the event that it is desired that the throttle release signal be given at a lower light intensity than the stop signal, an additional resistance indicated at 53 may be provided in series with the flashing unit 45 thereby reducing the voltage on the stop lights when they are energized by closing of the switch 42.

From the foregoing it is readily apparent that a simple and effective arrangement has been provided for co-ordinating with a conventional turn and stop light control an additional control for indicating slow-down due to release of the throttle control of the vehicle and that this arrangement has been provided without requiring additional signal lights and with the addition of relatively few elements to the circuits and the controls normally present in modern motor vehicles.

While the invention has been described in connection with a specific form of stop light and turn indicator, various modifications and other applications will occur to those skilled in the art. Therefore, it is not desired that the invention be limited to the specific details illustrated and described and it is intended by the appended claims to cover all modifications within the spirit and scope of the invention.

I claim:

1. In a motor vehicle signal light system including a pair of stop lights one on each side at the rear of the vehicle, means including a stop light circuit and dependent upon operation of the vehicle brakes for energizing said stop lights, turn indicator means including a first intermittent contact unit and a switch having movable and stationary parts for selectively energizing either one of said lights as a flashing signal, means including a normally closed circuit connected in parallel with said stop light circuit and having a second intermittent contact unit therein for energizing said stop lights simultaneously as flashing signals, means dependent upon the actuation of the throttle of the vehicle for opening said normally closed circuit whereby the circuit is closed only when the throttle is released, and means including relatively movable contacts on respective ones of said parts of said switch and dependent upon actuation of said turn indicator for opening said normally closed circuit whereby flashing of the light on the side opposite the turn signal is prevented while affording operation of the brake signal on such opposite side.

2. In a motor vehicle signal light system including a pair of stop lights one on each side at the rear of the vehicle, means including a stop light circuit and dependent upon operation of the vehicle brakes for energizing said stop lights, turn indicator means including a first intermittent contact unit and relatively movable switch parts for connecting said stop light circuit normally to energize both said stop lights and for selectively disconnecting either of said stop lights and connecting the disconnected light to said intermittent contact unit, means including a normally closed circuit connected in parallel with said stop light circuit and having a second intermittent contact unit therein for energizing said stop lights simultaneously as flashing signals, a pair of contacts on one of said parts and a bridging conductor on the other of said parts engaging said pair of contacts when said parts are in their normal position and being out of engagement with at least one of said contacts of the pair in both turn positions, one contact of said pair being connected to said stop light circuit and the other to said normally closed circuit whereby said normally closed circuit is opened by disengagement of said bar when said switch is in either turn position whereby flashing of the light on the side opposite the turn signal is prevented while affording operation of the brake signal on such opposite side.

References Cited in the file of this patent
UNITED STATES PATENTS

| | | |
|---|---|---|
| 2,086,959 | Ram | July 13, 1937 |
| 2,296,667 | Hemphill | Sept. 22, 1942 |
| 2,560,539 | Bailey | July 17, 1951 |
| 2,602,849 | Lawson | July 8, 1952 |